United States Patent
Costa et al.

(10) Patent No.: US 7,790,232 B2
(45) Date of Patent: Sep. 7, 2010

(54) SOL-GEL PROCESS FOR THE PREPARATION OF VITREOUS FILMS POSSESSING HIGH ADHESION PROPERTIES AND STABLE COLLOIDAL SOLUTIONS

(75) Inventors: Fulvio Costa, Sommo (IT); Lorenzo Costa, Sommo (IT)

(73) Assignee: Degussa Novara Technology S.p.A., Novara (IT)

( * ) Notice: Subject to any disclaimer, the term of this patent is extended or adjusted under 35 U.S.C. 154(b) by 1022 days.

(21) Appl. No.: 10/520,495

(22) PCT Filed: Jul. 7, 2003

(86) PCT No.: PCT/EP03/07275

§ 371 (c)(1),
(2), (4) Date: Jan. 5, 2005

(87) PCT Pub. No.: WO2004/007384

PCT Pub. Date: Jan. 22, 2004

(65) Prior Publication Data

US 2005/0215076 A1    Sep. 29, 2005

(30) Foreign Application Priority Data

Jul. 12, 2002  (IT)  ............... NO 2002 A 000009

(51) Int. Cl.
*B05D 3/02*  (2006.01)
*C04B 14/04*  (2006.01)

(52) U.S. Cl. .................... 427/376.2; 106/481; 106/490; 106/491

(58) Field of Classification Search .............. 427/376.2; 106/481, 490, 491
See application file for complete search history.

(56) References Cited

U.S. PATENT DOCUMENTS

| | | | | |
|---|---|---|---|---|
| 4,816,049 A | * | 3/1989 | Hata et al. | .................. 65/395 |
| 4,923,950 A | * | 5/1990 | Ravaine et al. | .............. 528/38 |
| 5,496,402 A | | 3/1996 | Sakamoto et al. | |
| 5,626,923 A | | 5/1997 | Fitzgibbons et al. | |
| 5,693,365 A | * | 12/1997 | Teranishi et al. | ......... 427/163.1 |
| 6,017,389 A | | 1/2000 | Schmidt et al. | |
| 6,130,152 A | | 10/2000 | Smith et al. | |
| 6,562,408 B1 | | 5/2003 | Costa et al. | |
| 2002/0160153 A1 | * | 10/2002 | Minami et al. | .............. 428/156 |

FOREIGN PATENT DOCUMENTS

FR    2 704 851    11/1994

OTHER PUBLICATIONS

H. Kim and H. Park "Surface Modified SiO2 Xerogel Films from HMDS / Acetone for Intermetal Dielectrics" from 2000 International Microprocesses and Nanotechnology Conference, Jul. 11-13, 2000 Tokyo, Japan p. 218-219.*
Holmes, A. S. et al., "Fabrication of buried channel waveguides on silicon substrates using spin-on glass," Applied Optics, Sep. 1, 1993, pp. 4916-4921, vol. 32, No. 25, Optical Society of America, Washington, D.C.
Almeida, Rui M., "Sol-gel silica films on silicon substrates," International Journal of Optoelectronics, 1994, pp. 135-142, vol. 9, No. 2, Taylor & Francis Ltd., United Kingdom.

* cited by examiner

Primary Examiner—Michael Cleveland
Assistant Examiner—Nathan H Empie
(74) Attorney, Agent, or Firm—Smith, Gambrell & Russell, LLP

(57) ABSTRACT

Process for the preparation and the deposition of vitreous films on substrates comprising: the dissolution of one or more metal alkoxides in aprotic solvent, the hydrolysis of the resulting solution, the eventual removal of the formed alcohol, the deposition of the resulting sol on the substrate surface of interest and the final drying of the film.

25 Claims, No Drawings

SOL-GEL PROCESS FOR THE PREPARATION OF VITREOUS FILMS POSSESSING HIGH ADHESION PROPERTIES AND STABLE COLLOIDAL SOLUTIONS

INTRODUCTION AND BACKGROUND

The present invention relates to a sol-gel process for the preparation of vitreous films characterized by high adhesion on the substrate of interest, to the vitreous films obtained thereby, and to the colloidal suspensions obtained in the initial phase of the above mentioned process, that can be removed and maintained as such for indefinite amount of time, before being processed again to achieve the film deposition.

More particularly, the object of the present invention is a process for the preparation and the deposition, on the surface of suitable substrates, of vitreous films comprising the operations of dissolving one or more metal alkoxides in an aprotic solvent, of adding controlled amounts of an aqueous solutions of a catalyst to the solution thereby obtained, of monitoring with adequate precision the hydrolysis reaction, of the eventual extraction and removal the amount of alcohol produced in the hydrolysis reaction, of the gelation of the sol on the surface of interest and of the final drying of the film. It is of particular importance in this invention, the possibility to stop the process after hydrolysis and before film deposition to isolate a sol that in the apparent condition of a clear and stable solution, can be stored safely for long time at room temperature.

The vitreous films are used in the field of telecommunications on physical carriers for both optical and electronic applications; because of their remarkable resistance to temperature, abrasion and corrosion, silica films are used, as an example, in processes typical of the electronic industry as surface planarizers in a semiconductor after previous treatments have created off-plane circuitry. Similar silica films are also used to produce electrical insulation between intracircuitry elements or between conductors of different circuits on a semiconductor chip.

Moreover [A. S. Holmes et al., "Applied Optics", Jan. 9, 1993, vol. 32, n. 25, pages 4916 -4912], silica films find applications as antireflexion and as planar wave-guides, or even as host material for active dopants for nonlinear optic as well as optical sensing applications.

Many methods were developed for the preparation of optical devices [A. S. Holmes et al., ibidem], among other, as an example, can be called the thermic oxidation of silicon, or the technique of deposition under reduced pressure, known as "sputtering", chemical vapor deposition, etc.

The technologies to which the above-cited methods refer are, however, relatively complex and sophisticated, their practical exploitation require specialized equipment and time-consuming procedures that result in relatively costly operations.

Moreover, the limited productivity to which often they are coupled erodes the convenience for their industrial application.

It is a consolidated conclusion [A. S. Holmes et al., ibidem; Rui M. Almeida, "International Journal of Optoelectronics", 1994, vol. 9, n. 2, pagg. 135-142], that the more promising technology for large scale production of vitreous films is the sol-gel technology. Such a technology is based on three fundamental steps:

a. sol formation in alcoholic medium (particle suspension or dispersion in a liquid),
b. gelation or transformation of sol by condensation into gel (a solid skeleton inglobating a continuous liquid phase),
c. drying of the gel.

In the procedure for vitreous film deposition on substrate, the sol is applied to the surface to be coated and the gel is formed as consequence of the solvent evaporation; a drying phase by simple heating complete the coating procedure.

It is however known that in the production of vitreous films, even through sol-gel based technology one have to face limitations, specially in the thickness of the films obtained and/or in the tendency of such films to crack, often in the drying phase.

Solutions to the problem were promptly sought and some of technical answers reported in this field by the scientific literature and by recent patents, with no doubt contain preludes to future industrial application. Examples of such important reports are following:

Italian patent application n. NO 98 A 000004 describes a sol-gel process for the preparation of thick films of silicon-dioxide that improves the well-known procedure by the addition of a certain quantity of fumed silica to the hydrolysis product of silicon alkoxide.

A. S Holmes et al. already quoted article describes a process of high-temperature consolidation of a multilayers film.

U.S. Pat. No. 6,130,152 describes a sol-gel process that teaches to add a combination of two solvents with different boiling point to the hydrolyzed solution (tetra-ethylorthosilahe, ethanol, water and acid).

U.S. Pat. No. 6,017,389 describes the preparation of siliceous films starting from the combination of tetraethylorthosilane and silica in anhydrous ethanol that is hydrolyzed by aqueous ammonia and necessitate of a very high thermal treatment at the end.

All the known solutions, of which the precedent paragraphs are only a few examples, make the sol-gel technology attractive for the preparation of vitreous films, but do not offer a fully convenient process for a broad industrial application either because of the temperature requirements or because of thickness, or for particular technicalities that could negatively influence the industriability of the process.

The Applicant has now found that it is possible to prepare and to deposit on substrates, according to the sol-gel technology, vitreous films following a procedure presenting none of the disadvantages of the known art, nor the limitations to general applicability so far reported on count of sol-gel technology.

SUMMARY OF THE INVENTION

As a matter of fact it is a first object of the present invention a process for the preparation and the subsequent deposition on suitable substrates of vitreous films comprising the following steps:

Preparation of a solution in an aprotic solvent of one or more alkoxides having the general formula $$X_m\text{—Me—}(OR)_{n-m}$$

where Me is a metal belonging to groups 3°, 4° or 5° of the Periodic System of the Elements; n is the Me valence; X is $R_1$ or $OR_1$, with $R_1$ equal to or different from R, m is zero or an integer number equal to or lower than 3; R and $R_1$ are hydrocarbon radicals with a number of carbon atoms up to 12.

Hydrolysis of the obtained solution in the presence of a catalyst by addition of water.

Eventual removal of the alcohol formed during the hydrolysis reaction.

Deposition of the sol on the substrate of interest.

Final drying and stabilization of the film characterized by the fact that the preparation of the sol occurs in an aprotic medium.

DETAILED DESCRIPTION OF INVENTION

The film deposition can be carried out immediately after completing the hydrolysis reaction, or the colloidal dispersion obtained in this phase can be removed, whatever be the level of hydrolysis reached and stored indefinitely to be used at a desired time: this peculiar solution is characteristic of the process of the current invention and also define the second object of the invention as just here stated: to provide a stable sol constituted by the hydrolysis products of an alkoxide corresponding to the above-reported formula, dissolved in an aprotic solvent, from which eventually the alcohol produced by the hydrolysis itself would have been removed. On this ground are important aspects of the process of this invention the following:

simplicity of preparation of the sol composition and stability thereof in time at room temperature;

easiness of film casting, according to known techniques executed under mild conditions and with acceptable times;

rapid gelation times, with film remaining homogeneous and the mechanical characteristics of the substrate remaining unchanged;

not need for post-treatments.

As a consequence of such a process the films, also object of the present invention, are characterized by:

high adhesion to substrate;

final shrinking without crackings;

good mechanical and insulating properties;

good planarization capacity on the substrate surface;

good optical properties.

Referring to the process for the preparation vitreous films according to the present invention, in the above alkoxide formula the "metal" can preferably be silicon and, among all possible alkoxides, particularly suitable to the purposes of the present invention can be the following:

tetramethylorthosilicate
tetraethylorthosilicate
tetrapropylorthosilicate
tetrabutylorthosilicate
ethyltriethoxysilane
methyltrimethoxysilane
methyltriethoxysilane The alkoxide or mixture of alkoxides can be dissolved in a suitable solvent and reacted with controlled amounts of water in the presence of a catalyst, preferably of acid or basic character: the reaction can be accomplished, under agitation, at room temperature, for a time included between few minutes and few hours. The medium is an aprotic compound and can be preferably chosen among acetone, tetrahydrofuran, dioxane; the alkoxide can be dissolved in such a solvent or mixture of solvent at a concentration between 30 and 60% by weight.

Hydrolysis reaction can be carried out through addition of controlled amounts of water, so to maintain the molar ratio $H_2O/Me$ between 0,5 and 5, preferably between 1,5 and 4 and, even more preferably between 2 and 3. As far as the acid catalyst is concerned, this might be any mineral or organic acid with Ka between 0,1 and 3.

The basic catalyst can be ammonia, other amines suitable for the control of pH in the sol, or other suitable to the purpose.

According to a preferred embodiment of the inventive process, the hydrolysis can be conducted in the presence of aqueous molar solution of HCl.

The molar ratio between alkoxide and acid can range from 1/0,001 to 1/1, but is preferably that such a ratio be maintained between 1/0,1 and 1/0,01. At the end of the hydrolysis reaction, the product has the appearance of a clear liquid, free from solid particles due to traces of insoluble gels. It is possible at this point, according to an original and innovative aspect of the present invention, to obtain a sol with improved stability by elimination of the alcohol formed in the hydrolysis reaction.

The removal of the alcohol can be accomplished following any methods known to the state of the art. To the purpose of exemplification the Applicant reports the experimental event that in the case of ethanol produced by the hydrolysis reaction, this is removed subjecting the sol to a controlled partial desolventization in constant evaporation under reduced pressure, keeping the colloidal suspension at a temperature of about 40° C.

As previously mentioned, the process according to the present invention can be interrupted in its course after hydrolysis, thus obtaining a sol that is an object and an integral part of the present invention, characterized by high stability and such as to allow its long time storage without deterioration or contamination by insoluble precipitates that will compromise any further use thereof. The storage and conservation of such sol can simply be at room temperature.

The final sol so obtained after the hydrolysis reaction or after storage, is used for the deposition of the films having the characteristic properties already described. Deposition on the desired substrate does not present any particular difficulty and can be carried out according to the various techniques used in the known art as knife deposition, dip-coating, spin-coating. An important property of the sol according to the present invention is that of join to its high shelf stability its short time of gelation once deposited on the substrate. Referring, as an example, to the deposition for spin-coating the films are deposited in seconds using rotational speed of the order of 1500/2500 rpm and they do not any washing or post-treatments. The coated substrates can be moved immediately because the instant-gelation makes it solid at the time of removal from the spin-coater. In fact it is an important property of the film according to the invention to demonstrate excellent adhesion with regard to the majority of the substrates used in industry as, for example, silicon semiconductor wafers, gallium arsenide, polycrystalline silicon, glass, quartz glass etc.

The final drying of the film has the purpose to completely eliminate the residual solvent from the gel and to complete the film stabilization; it can be conducted setting the film-substrates in an oven at temperatures between 80° C. and 500° C. The operation is completed in 10-20 minutes time-span and is occurring without the appearing of inhomogeneities and defects on the film due to impurities and or cracking caused by excessive shrinking of the gel in the drying phase.

According to an alternative embodiment of the inventive process, separate alkoxide solutions can also be prepared the same undergoing hydrolysis at different times. The distinct sols obtains thereby can be used to deposit films on different samples of the substrate of interest on different substrates as well as on the same substrate according to a deposition order suggested by the skillness or the technological needs, or they can be recombined into one sol of more integrated properties for better matching the specifications required in the deposited films.

Finally we should underline that in the process according to the present invention there are no problems concerning film-thickness and it is possible to obtain any value of thickness, between 10 nm and 2 nm. The final thickness is controllable by monitoring concentration of network precursor into the sol as well alkoxide or alkoxide mixtures types entered. The Applicant has determined that alkoxides corresponding to the above formula with X equal to $R_1$ contribute thickness higher than the ones of the film obtained via alkoxides where X is equal to $OR_1$: special formulations of sol that controls film thickness through the use of different type of alkoxides is not only possible but, at times very practical within the frame of the process of the present invention.

In the following are reported some achievements in the field of present invention only for the purpose of supplying practical examples without any limitation of the invention itself to those embodiments.

EXAMPLES

Example 1

Preparation of a Sol Based on Tetraethylorthosilicate

A 1 l. round flask containing a magnetic stirrer bar is loaded with 266 g of an anhydrous acetone and 156,8 g (0,75 moles) of tetraethylorthosilicate (TEOS). Keeping the flask at room temperature, under constant stirring 32,4 g of HCl 1M aqueous solution are added by slow dropping (molar ratio TEOS: $H_2O$: HCl=1: 2,3: 0,016). The addition of water requires about 15 minutes. During this time the temperature rises from 20° C. to 40° C.

Stirring of the mixture is maintained for about 15 minutes, then from what is now a clear liquid a volume of 50 c is collected and stored in a glass container with screw stopper (Solution A).

With the same procedure an identical round flask is loaded with 266 g of anhydrous ethanol. The same procedure used to prepare the acetone sol (solution A) is now used to prepare an analogous sol in ethanol (solution B) both solutions are left on the laboratory bench.

After 2 days solution B shows clear sign of gelation. Solution A maintains its original status after 1 month without any indication of gelation.

Example 2

266 g of anhydrous dioxane and 156,8 g (o,75 moles) of tetraethylorthosilicate (TEOS) are loaded on 1 l. round flask containing a magnetic stirrer bar. Following the experimental procedures of example 1, 41,6 g of 1M aqueous HCl are added (molar ratios TEOS: $H_2O$: HCl=01: 2,32: 0,016).

After 30 minutes a fraction of liquid (50 ml) are removed from the flask and stored in a glass container with screw cap and called Solution C. The remaining solution is transferred to a rotating evaporator and subjected to evaporation at a reduced pressure (about 100 tor) for about 20 minutes, keeping the internal temperature at 5° C. and collecting about 80 ml of evaporated liquid. The evaporation is interrupted and an equal volume of dioxane added to replace the ethanol solution removed. The evaporation is restarted under the same conditions. In parallel, the concentration of ethanol in the evaporate is determined by gas chromatography. The operation of evaporation and replacement of evaporate with dioxane is repeated until the chromatographic analysis of the collected liquid shows 99% extraction of ethanol generated in hydrolysis. A sample of 50 ml of the sol so treated is transferred to a glass container with a screw cap and stored as Solution D. Solution C shows clear signs of gelation after 30 days, while Solution D maintains its original condition after 365 days without sign of gelation.

Example 3

177 g of anhydrous dioxane, 122 g (0,588 moles) of TEOS and 68,4 g (0,384 moles) of methylthreethylorthosilicate (MTEOS) are introduced in a 1 l. round flask. Following the procedures of example 1, 41,6 g of HCl 1M aqueous, solution are added (molar ratios TEOS: MTEOS: $H_2O$:HCl=1: 0,65: 2,22: 0,0416). After 30 minutes a fraction of 50 ml of the liquid is removed, stored in a glass bottle with a screw cup and labeled Solution E. The remaining liquid is set into a rotating evaporator and evaporated with the procedures of example 2 completing 3 cycles of evaporation and dioxane addition.

The chromatographic analysis of the evaporated solvents indicate that 99% of the ethanol produced in hydrolysis has been recovered. A sample of 50 ml of the liquid remaining in the evaporator flask (sol) is removed, stored in a glass bottle with a screw cup and labeled Solution F. Solution E shows clear signs of gelation after 30 days while solution F maintains its original condition without signs of gelation after 365 days.

The invention claimed is:

1. A process for the preparation and the deposition of a vitreous film on a substrate comprising:
   preparing a solution in an aprotic solvent selected from the group consisting of acetone, tetrahydrofuran and dioxane of at least one metal alkoxide corresponding to the formula $$X_m\text{—Me—}(OR)_{n-m}$$

where Me is a metal selected from the group consisting of Group 3°, 4° and 5° of the Periodic Table of Elements; n is the valence of Me; X is $R_1$ or $OR_1$, $R_1$ is the same as or different from R, m is either zero or integer number equal to or lower than 3; R and $R_1$ are hydrocarbon radicals with a number of carbon atoms equal to or lower than 12;
   adding a catalyst to the solution;
   hydrolyzing the solution in the presence of the catalyst in a hydrolysis reaction by addition of water to maintain a molar ratio of $H_2O$/Me between 0.5 and 5 to obtain a clear hydrolysis reaction product;
   removing alcohol formed during the hydrolysis reaction under reduced pressure and forming a sol in the presence of the aprotic solvent wherein an equal volume of the aprotic solvent replaces the alcohol removed;
   depositing the hydrolysis reaction product in the form of a sol on the substrate;
   optionally drying and stabilizing of the vitreous film.

2. The process for the preparation and deposition of a vitreous film onto a substrate according to claim 1 wherein the alkoxide is selected from the group consisting of tetramethylorthosilicate, tetraethylorthosilicate, tetrapropylorthosilicate, tetrabutylorthosilicate, ethyltriethoxysilane, methyltrimethoxysilane, methyltriethoxysilane, and mixture thereof.

3. The process for the preparation and deposition of a vitreous film onto a substrate according to claim 1 where the solution of the alkoxide or mixture of alkoxides in the aprotic solvent is from 30% to 60% by weight.

4. The process for the preparation and deposition of a vitreous film onto a substrate according to claim 1 wherein hydrolyzing of the alkoxide is accomplished by adding a controlled quantity of water.

5. The process for the preparation and deposition of a vitreous film onto a substrate according to claim 1 where the ratio $H_2O/Me$ is from 1.5 to 4.

6. The process for the preparation and deposition of a vitreous film onto a substrate according to claim 5 where the ratio $H_2O/Me$ is from 2 to 3.

7. The process for the preparation and deposition of a vitreous film onto a substrate according to claim 1 where hydrolyzing of the alkoxide is accomplished in presence of an acid catalyst selected from the group consisting of mineral and organic acids with Ka of 0.1 to 3.

8. The process for the preparation and deposition of a vitreous film onto a substrate according to claim 7 where the reaction of hydrolyzing is in presence of an aqueous solution of HCl.

9. The process for the preparation and deposition of a vitreous film onto a substrate according to claim 7 where the reaction of hydrolyzing is in presence of a quantity of acid such that a molar ratio alkoxide/acid is from 1/0.001 to 1/1.

10. The process for the preparation and deposition of a vitreous film onto a substrate according to claim 9 where the molar ratio of alkoxide to acid is preferably from 1/0.1 to 1/0.01.

11. The process for the preparation and deposition of a vitreous film onto a substrate according to claim 1 where the removal of the alcohol is made by subjecting the sol to partial and controlled desolventization.

12. The process for the preparation and deposition of a vitreous film onto a substrate according to claim 1 further comprising depositing on substrate by knife coating, dip coating or spin-coating.

13. The process for the preparation and deposition of a vitreous film onto a substrate according to claim 1 further comprising depositing on substrate by spin-coating.

14. The process for the preparation and deposition of a vitreous film onto a substrate according to claim 1 where final drying is at a temperature of 20 to 500° C.

15. A process for the preparation of a sol for the preparation of a vitreous film on a substrate comprising:

preparing a solution in an aprotic solvent selected from the group consisting of acetone, tetrahydrofuran and dioxane of at least one metal alkoxide corresponding to the formula

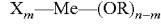

$$X_m\text{—Me—}(OR)_{n-m}$$

where Me is a metal selected from the group consisting of Group 3°, 4° and 5° of the Periodic Table of Elements; n is the valence of Me; X is $R_1$ or $OR_1$, $R_1$ is the same as or different from R, m is either zero or integer number equal to or lower than 3; R and $R_1$ are hydrocarbon radicals with a number of carbon atoms equal to or lower than 12;

adding a catalyst to the solution;

hydrolyzing the solution in the presence of the catalyst in a hydrolysis reaction by addition of water to maintain a molar ratio of $H_2O/Me$ between 0.5 and 5 to obtain a clear hydrolysis reaction product;

removing alcohol formed during the hydrolysis reaction under reduced pressure and forming the sol in the aprotic solvent wherein an equal volume of the aprotic solvent replaces the alcohol removed.

16. The process for the preparation of a sol according to claim 15 wherein the alkoxide is selected from the group consisting of tetramethylorthosilicate, tetraethylorthosilicate, tetrapropylorthosilicate, tetrabutylorthosilicate, ethyltriethoxysilane, methyltrimethoxysilane, methyltriethoxysilane, and mixture thereof.

17. The process for the preparation of a sol according to claim 15 where the solution of the alkoxide or mixture of alkoxides in the aprotic solvent is from 30% to 60% by weight.

18. The process for the preparation of a sol according to claim 15 wherein hydrolyzing of the alkoxide is accomplished by adding a controlled quantity of water.

19. The process for the preparation of a sol according to claim 15 where the ratio $H_2O/Me$ is from 1.5 to 4.

20. The process for the preparation of a sol according to claim 19 where the ratio $H_2O/Me$ is from 2 to 3.

21. The process for the preparation of a sol according to claim 15 where hydrolyzing of the alkoxide is accomplished in presence of an acid catalyst selected from the group consisting of mineral and organic acids with Ka of 0.1 to 3.

22. The process for the preparation of a sol according to claim 21 where the reaction of hydrolyzing is in the presence of an aqueous solution of HCl.

23. The process for the preparation of a sol according to claim 22 where the reaction of hydrolyzing is in presence of a quantity of acid such that a molar ratio alkoxide/acid is from 1/0.001 to 1/1.

24. The process for the preparation of a sol according to claim 23 where the molar ratio of alkoxide to acid is preferably from 1/0.1 to 1/0.01.

25. The process for the preparation of a sol according to claim 15 where the removal of the alcohol is made by subjecting the sol to partial and controlled desolventization.

* * * * *